(12) United States Patent
Hirahara

(10) Patent No.: US 8,958,103 B2
(45) Date of Patent: Feb. 17, 2015

(54) MANAGEMENT APPARATUS, MANAGEMENT METHOD AND COMPUTER READABLE MEDIUM FOR CONFIRMING IDENTITY OF A DEVICE IN A NETWORK USING IDENTIFICATION INFORMATION AND LOG INFORMATION

(71) Applicant: Canon Kabushiki Kaisha, Tokyo (JP)

(72) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/074,163

(22) Filed: Nov. 7, 2013

(65) Prior Publication Data

US 2014/0146356 A1 May 29, 2014

(30) Foreign Application Priority Data

Nov. 29, 2012 (JP) ................. 2012-261632

(51) Int. Cl.
G06F 3/12 (2006.01)
H04L 12/24 (2006.01)
G06K 15/00 (2006.01)

(52) U.S. Cl.
CPC ............ *G06F 3/1273* (2013.01); *G06F 3/1204* (2013.01); *G06F 3/1231* (2013.01); *G06F 3/1285* (2013.01); *H04L 41/28* (2013.01)
USPC ......................... 358/1.15; 358/1.18

(58) Field of Classification Search
CPC .... G06F 3/1273; G06F 21/604; G06F 21/608
USPC ............... 358/1.1, 1.9, 1.13, 1.14, 1.15, 1.18, 358/402; 709/201, 223, 224, 225
See application file for complete search history.

(56) References Cited

U.S. PATENT DOCUMENTS

2010/0274984 A1* 10/2010 Inomata et al. ............... 711/162
2011/0246644 A1* 10/2011 Hamada ......................... 709/224
2012/0209977 A1* 8/2012 Nakajo .......................... 709/223
2013/0018859 A1* 1/2013 Wilkins ......................... 707/696

FOREIGN PATENT DOCUMENTS

JP 2006-072792 A 3/2006

* cited by examiner

*Primary Examiner* — Gabriel Garcia
(74) *Attorney, Agent, or Firm* — Carter, DeLuca, Farrell & Schmidt, LLP

(57) ABSTRACT

For a device from which identification information (serial number) cannot be obtained when configuration information of the device has been changed, log information is obtained from the device and is compared to stored log information, thereby confirming identity of the device. The device whose identity can be confirmed is continued to be monitored.

15 Claims, 10 Drawing Sheets

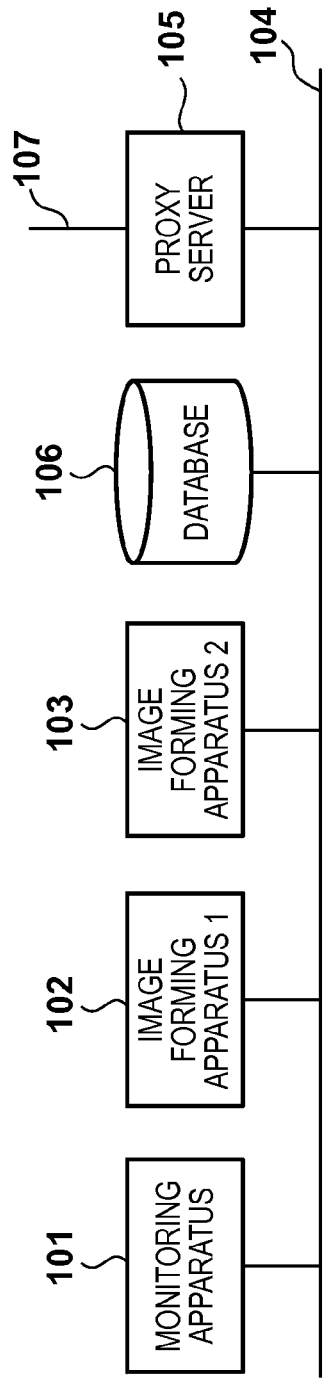
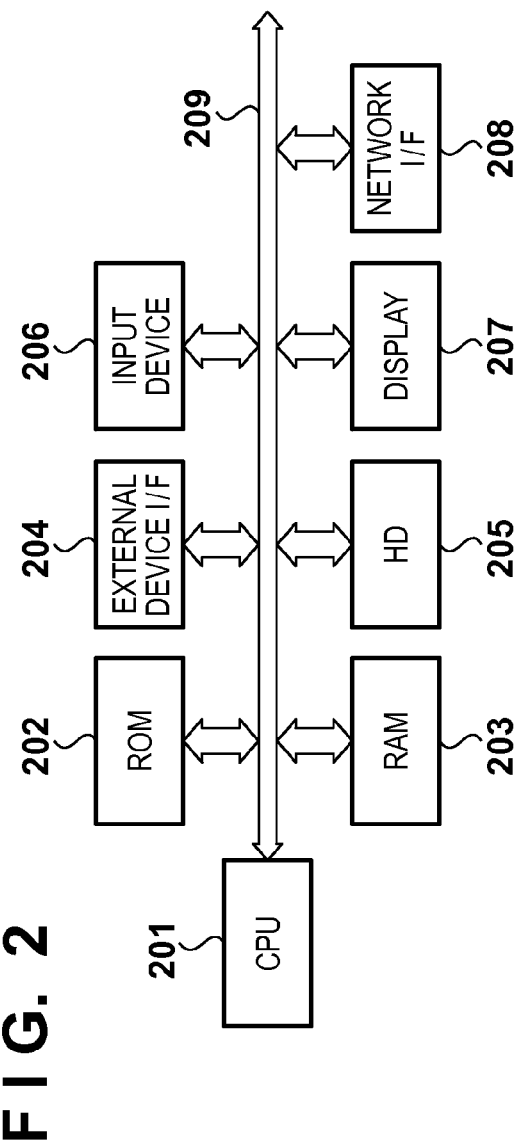

F I G. 5

| 500 501 | 502 | 503 | 504 | 505 | 506 | 507 | 508 | 509 | 510 |
|---|---|---|---|---|---|---|---|---|---|
| LogNo | Occurred DateTimes | Revert DateTimes | Code | Position | Total Pages | Action | MediaId | Orientation | Feeder Position |
| ... | ... | ... | ... | ... | ... | ... | ... | ... | ... |
| 0x000123456 | 2012/9/12 12:11:22.031 | 0 | 0x11010005 | 0x01 | 0x00011235 | 0x00000001 | 0x00010233 | 0x01 | 0x0001 |
| 0x000123457 | 0 | 2012/9/12 13:01:12.001 | 0x11010005 | 0x01 | 0x00011235 | 0x00000001 | 0x00010233 | 0x01 | 0x0001 |
| 0x000123458 | 2012/9/14 16:00:02.021 | 0 | 0x11010016 | 0x01 | 0x00012031 | 0x00000003 | 0x00200141 | 0x01 | 0x0002 |
| 0x000123459 | 0 | 2012/9/14 16:05:31.055 | 0x11010016 | 0x01 | 0x00012031 | 0x00000003 | 0x00200141 | 0x01 | 0x0002 |
| ... | ... | ... | ... | ... | ... | ... | ... | ... | ... |

FIG. 10

| DeviceId | SerialNo | MACAddress | HostName | IPv4Address | IPv6Address | ProductName |
|---|---|---|---|---|---|---|
| ABC011230001 | 0 | 00:00:85:BA:11:22 | PRN00123401.ser11.abccompany.jp | 10.12.34.11 | 0 | MFP1000 |
| ABC011230002 | 0 | 00:00:85:BE:33:41 | PRN00123402.ser11.abccompany.jp | 10.12.34.12 | 0 | MFP1010 |
| ABC011230003 | A011DBN13058 | 00:00:85:BA:C5:62 | PRN00123403.ser11.abccompany.jp | 10.12.34.13 | 0 | MFP5010 |
| ABC011230004 | A011DBN13059 | 00:00:85:BB:D0:13 | PRN00123404.ser11.abccompany.jp | 10.12.34.14 | 0 | MFP5020 |
| ... | ... | ... | ... | ... | ... | ... |

FIG. 11

| DeviceID | LogType | ObtainedLogNo | SentLogNo |
|---|---|---|---|
| ABC011230001 | JAM | 0x000123459 | 0x000123457 |
| ABC011230001 | SERVICECALL | 0x00000134 | 0x00000133 |
| ABC011230001 | ALARM | 0x00051005 | 0x00051005 |
| ABC011230001 | ENVIRONMENT | 0x00001101 | 0x00001100 |
| ABC011230001 | USEROPERATION | 0x00001101 | 0x00001100 |
| ... | ... | ... | ... |

FIG. 12

| DeviceID | LogType | LogNo | OccurredDateTimes | RevertDateTimes | Code | Position | TotalPages | Action |
|---|---|---|---|---|---|---|---|---|
| ABC011230001 | JAM | 0x000123457 | 0 | 2012/9/12 13:01:12.001 | 0x11010005 | 0x01 | 0x00011235 | 0x00000001 |
| ABC011230001 | JAM | 0x000123458 | 2012/9/14 16:00:02.021 | 0 | 0x11010016 | 0x01 | 0x00012031 | 0x00000003 |
| ABC011230001 | JAM | 0x000123459 | 0 | 2012/9/14 16:05:31.055 | 0x11010016 | 0x01 | 0x00012031 | 0x00000003 |
| ... | ... | ... | ... | ... | ... | ... | ... | ... |

MANAGEMENT APPARATUS, MANAGEMENT METHOD AND COMPUTER READABLE MEDIUM FOR CONFIRMING IDENTITY OF A DEVICE IN A NETWORK USING IDENTIFICATION INFORMATION AND LOG INFORMATION

BACKGROUND OF THE INVENTION

1. Field of the Invention

The present invention relates to a management apparatus and management method, which manage various devices including, for example, image forming apparatuses such as a printer and copying machine.

2. Description of the Related Art

Conventionally, a device management system, which remotely monitors operation states of peripheral devices (to be referred to as devices hereinafter) including image forming apparatuses such as a printer and copying machine, and collects billing information and use states of expendables, is known. In this device management system, correct management information of devices to be managed cannot often be obtained due to a change in device configuration information such as network settings, replacement of a network board, replacement by other devices, and the like. For this reason, a proposal for detecting a change in device configuration information, and obtaining information from correct devices when the device configuration information has been changed has been made.

For example, Japanese Patent Laid-Open No. 2006-72792 describes the following technique. That is, when a network board detects replacement of itself, it sends device specific information (serial number) and replacement time to a device management apparatus, and the device management apparatus specifies a device from which a log is corrected based on the device specific information and time at a log collection timing.

However, the technique described in Japanese Patent Laid-Open No. 2006-72792 is premised on that device specific information such as a serial number can be obtained, but that technique is not applicable to a case in which a device from which device specific information cannot be obtained is to be managed. Also, when device specific information such as a serial number cannot be obtained, a MAC address is normally used as device specific information. However, since the MAC address is specific information of a network interface, replacement of a network board and that of a device main body cannot be coped with.

SUMMARY OF THE INVENTION

The present invention has been made in consideration of the aforementioned related art, and has the following arrangement.

According to one aspect of the present invention, a management apparatus for managing a device connected to a network, comprises: a first management unit configured to manage first identification information of a device to be managed; a first storage unit configured to store log information obtained from the device to be managed; a first determination unit configured to determine whether or not first identification information which is obtained from a device from which first information is allowed to be obtained via the network matches the first identification information managed by the first management unit; a second storage unit configured to store operation information obtained from a device in association with the device from which the first identification information which is determined by the first determination unit to match the managed first identification information is obtained; and a second determination unit configured to determine whether or not log information obtained from a device from which first identification information is not allowed to be obtained via the network matches the log information stored in the first storage unit, wherein the second storage unit stores operation information obtained from a device in association with the device from which the log information which is determined by the second determination unit to match the stored log information is obtained.

According to the aforementioned arrangement, even for a device from which device identification information cannot be obtained, identity with an already managed device can be judged, and even when the device configuration has been changed, automatic monitoring is allowed.

Further features of the present invention will become apparent from the following description of exemplary embodiments with reference to the attached drawings.

BRIEF DESCRIPTION OF THE DRAWINGS

FIG. 1 is a block diagram showing the overall arrangement of a device monitoring system according to one embodiment;

FIG. 2 is a block diagram showing an example of the H/W arrangement of a monitoring apparatus 101;

FIG. 5 shows an example of a log information management table of the image forming apparatuses 102 and 103;

FIG. 10 shows an example of a management device list of the monitoring apparatus 101 according to the embodiment;

FIG. 11 shows an example of a log information management table of the monitoring apparatus 101 according to the embodiment; and FIG. 12 shows an example of a jam log management table of the monitoring apparatus 101 according to the embodiment.

DESCRIPTION OF THE EMBODIMENTS

Figure 3:
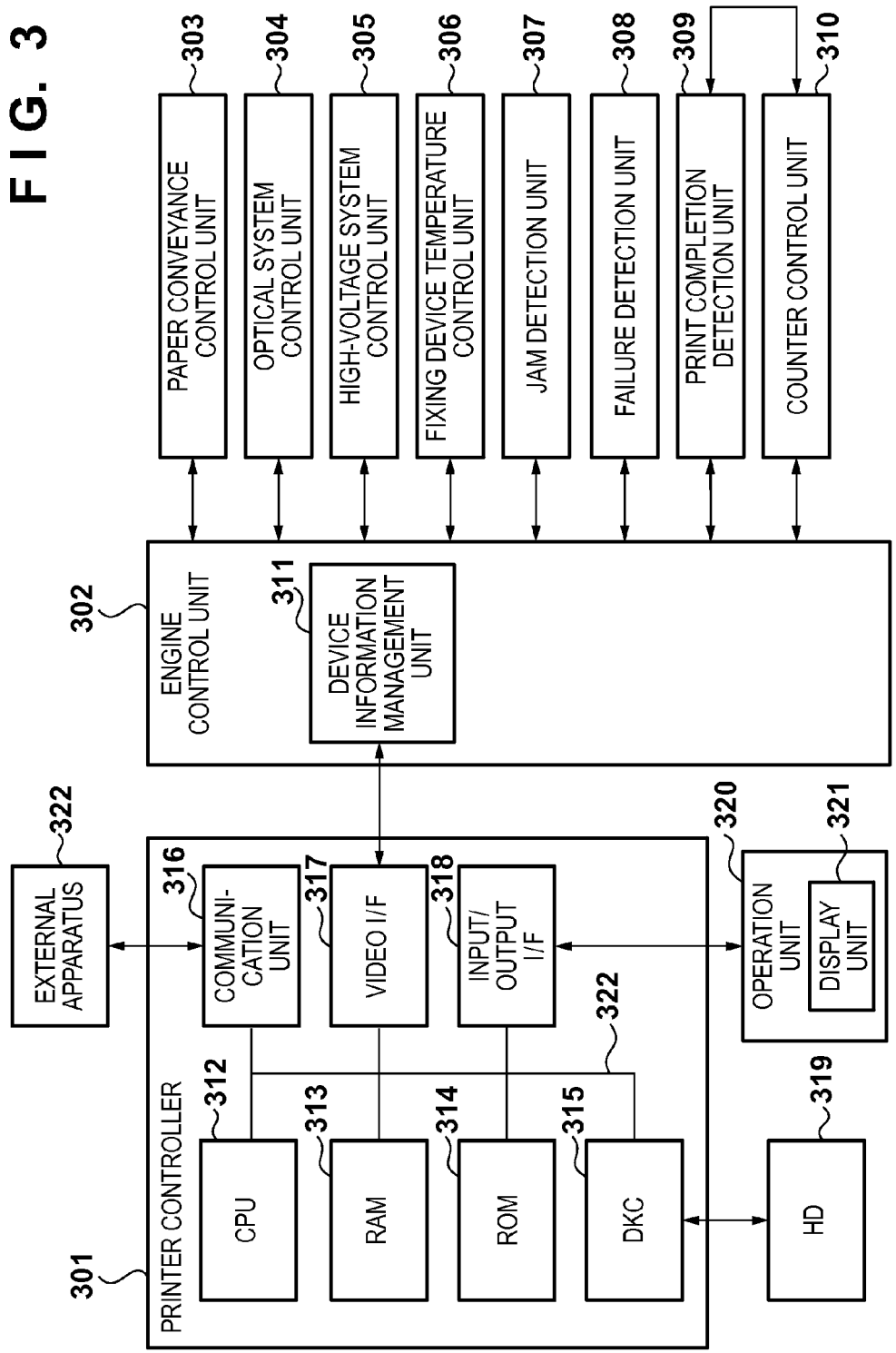
FIG. 3 is a block diagram showing an example of the H/W arrangement of image forming apparatuses 102 and 103.

An embodiment of the present invention will be described hereinafter with reference to the drawings. FIG. 1 is a schematic block diagram shown the arrangement of a device monitoring system according to this embodiment. To a plurality of image forming apparatuses 102 and 103 to be monitored and managed, a monitoring apparatus (to be also referred to as a management apparatus hereinafter) 101, which monitors operation states, expendable states, billing data, and the like of these image forming apparatuses, and a database 106, which stores various data, are connected via a LAN 104 to be able to communicate with each other. This monitoring apparatus 101 is an information processing apparatus, that is, a computer, which is connected to the Internet 107 via a proxy server 105, and can communicate with a central management apparatus used to manage out of stock states of various expendables, error notifications, and billing information. Note that when the functions of the proxy server 105 are included in the monitoring apparatus 101, the proxy server 105 need not be arranged.

The monitoring apparatus 101 will be described in more detail below. The monitoring apparatus 101 stores, for each image forming apparatus, variables N(k) of counter values such as the total number of sheets and total number of pages printed so far (for example, the number of pages for each size, the number of pages of color or monochrome printing, and the like), and various kinds of log information such as error logs. The monitoring apparatus 101 obtains various kinds of information via an external I/F, and stores them in a storage device such as a RAM 203 or HD 205, or the database 106 or the like. The database 106 is a database which serves as an information storage unit and stores information required for monitoring, and counters, device configuration information, various kinds of log information, a trouble pattern table, and the like. Note that the database 106 may physically exist in the monitoring apparatus 101.

<Arrangement of Monitoring Apparatus>

FIG. 2 is a block diagram for explaining the arrangement of an information processing apparatus, that is, the arrangement of the monitoring apparatus 101 in FIG. 1 or a central management apparatus (not shown) connected via the Internet. Referring to FIG. 2, a CPU 201 is a control unit of the information processing apparatus, and executes application programs, printer driver programs, an OS, a device monitoring program, and the like, which are stored in an HD (Hard Disk) 205. In this arrangement example, one CPU is included, but a plurality of CPUs may also be included.

A ROM 202 is a read-only storage unit, and stores a basic I/O program, and programs and data used to control respective processes on this apparatus. A RAM 203 executes control to temporarily store information, files, and the like required to execute programs, and functions as a main memory, work area, and the like of the CPU 201. Assume that processes of respective steps of the monitoring apparatus 101 in respective flowcharts to be described later are implemented when the CPU 201 executes processes based on program codes stored in storage units such as the ROM 202 and RAM 203.

An external device I/F 204 connects an external storage device and the like. By connecting the external storage device, programs and the like stored in storage media can be loaded to this information processing apparatus. Note that arbitrary storage media such as an FD, CD-ROM, CD-R, CD-RW, PC card, DVD, IC memory card, MO, and memory stick can be used.

The HD (Hard Disk) 205 stores various data including programs and data related to respective processes of this apparatus, temporary data, information associated with the image forming apparatuses to be monitored, data obtained from the image forming apparatuses, and the like. In this arrangement example, one HD is included, but a plurality of HDs may also be included.

An input device 206 as an instruction input unit includes a keyboard, pointing device, and the like. The input device 206 allows the user of this system (for example, a service person, operator, administrator, and the like) to input instructions of settings, operations, and the like to the information processing apparatus.

A display 207 as a display unit displays instructions input from the input device 206, and states and settings of the image forming apparatuses to be monitored. Note that in practice, information obtained when a graphic card interprets rendering commands issued by an application via a mechanism of the OS to convert them into analog or digital signals is often displayed on the display unit. Display control in this embodiment includes processing for controlling to generate rendering commands via the OS so as to be displayed on the display unit.

A network I/F 208 connects the LAN and Internet via a network, and exchanges information with external apparatuses. The information processing apparatus exchanges data with an external apparatus via the interface 208. A system bus 209 controls data flows of these elements 201 to 208 in the information processing apparatus.

<Arrangement of Image Forming Apparatus>

FIG. 3 is a block diagram of a printer control unit and its peripheral units of the image forming apparatus according to the embodiment. In FIG. 3, a printer controller 301 includes a communication unit 316 which executes transmission/reception of various data using a predetermined protocol with an external apparatus 322 (the monitoring apparatus 101 in FIG. 1 or the like) such as a host computer. Furthermore, the printer controller 301 includes a video I/F 317 or the like, which is required to make communications, to receive image data, to render received image data into printable information of a printer, to exchange signals with an engine control unit 302 (to be described later), and to make serial communications.

A CPU 312 of the image forming apparatus systematically controls accesses to various devices connected to a system bus 322 based on control programs and the like stored in a ROM 314 or HD (external memory) 319. Furthermore, the CPU 312 outputs an image signal as output information to a printer engine connected via the video I/F 317. A RAN 313 functions as a main memory, work area, and the like of the CPU 312. A memory controller (DKC) 315 controls accesses to an external storage medium 319 such as an HD (Hard Disk) which stores a boot program, various applications, font data, user files, setting files, and the like.

An operation unit 320 includes a display unit 321 and an input unit such as a keyboard, and is used to provide information to the operator and to allow the operator to input instructions via an input/output I/F 318.

An engine control unit 302 exchanges signals with the printer controller 301, and controls respective units of the printer engine via serial communications. Note that the printer engine includes following components. A paper conveyance control unit 303 conveys a paper sheet used in printing, and executes paper conveyance until paper discharging after printing based on an instruction of the engine control unit 302. An optical control unit 304 drives a scanner motor and executes ON/OFF control of a laser based on an instruction of the engine control unit 302. A high-voltage system control unit 305 executes high-voltage outputs required for an electrophotography process such as charging, development, and transfer based on an instruction of the engine control unit 302. A fixing device temperature control unit 306 executes temperature control of a fixing device based on an instruction of the engine control unit 302, and also executes abnormality detection and the like of the fixing device. A jam detection unit 307 detects a conveyance error during paper conveyance. A failure detection unit 308 detects failures of function units in the printer. A print completion notification unit 309 detects that printing is normally complete, and notifies the engine control unit 302 of that information. A counter control unit 310 updates various kinds of counter information after printing.

The engine control unit 302 includes a device information management unit 311 which manages information of respective units of the printer engine. The device information management unit 311 obtains, for example, a counter value from the counter control unit in response to a request from the external apparatus 322, and passes the counter value to the video I/F 317. Thus, the counter information is sent to the external apparatus 322 via the video I/F 317 and communication unit 316. In addition, when an information obtainment request is received from the external apparatus 322, the device information management unit 311 obtains information from respective units as needed.

Furthermore, the device information management unit 311 also manages jam information notified from the jam detection unit 307 and error information notified from the failure detection unit 309. These pieces of information are stored in a nonvolatile area of the HD 319 or the like as log information together with occurred times/recorded times, and a predetermined number of pieces of information are held. The external apparatus 322 can be notified of these pieces of log information as log write events when they are written. When the external apparatus 322 issues a log write event registration request to the image forming apparatus in advance, and when log information is written, it is notified to the external apparatus 322 as a log write event via the video I/F 317 and the like. An event handle is issued at the time of a log write event registration request, and the issued event handle is registered in the device information management unit 311 in association with a type of log information (to be referred to as a log type hereinafter) corresponding to the registration request, and a device. At the time of event notification, since log information to be notified includes an event handle, a notification source device and log type associated with the event handle can be specified. The external apparatus 322 can obtain log information via the device information management unit 311 in the same manner as the aforementioned counter information at a reception timing of this event notification or an arbitrary timing. Note that the device information management unit 311 issues the event handle in this example, and sends the issued event handle to an event registration request source (for example, the external apparatus 322). Also, the device information management unit 311 registers the issued event handle in association with a type of requested log information and the like. Based on this event registration, when a corresponding log write event has occurred, the device information management unit 311 notifies the event registration request source of occurrence of the log write event. Note that the event handle may be configured to be issued by the event registration request source. However, in order to issue a unique event handle for each image forming apparatus, an ID of the image forming apparatus is required to be added.

<Functional Arrangement of Monitoring Apparatus>

Figure 4:
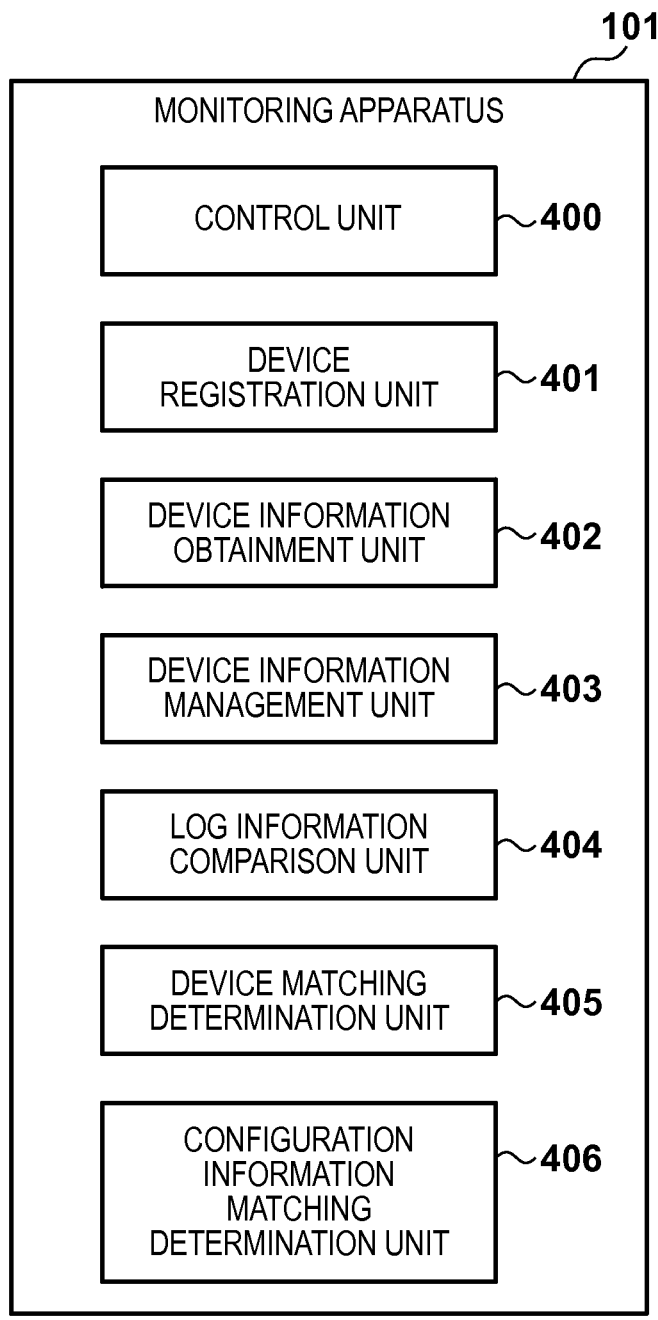
FIG. 4 is a block diagram showing an example of the function module arrangement of the monitoring apparatus 101.

Function modules of the monitoring apparatus shown in FIG. 4 will be described in detail below. A control unit 400 corresponds to the CPU 201 in FIG. 2. The control unit 400 controls the following function modules based on program codes stored in various storage units.

A device registration unit 401 is called when the control unit 400 detects a device registration request from a network device, and executes device registration processing. More specifically, at the time of registration, a device information obtainment unit 402 obtains configuration information from a device using network information of the device as the registration request source as input information, and registers the obtained information n a management device list 1000 (FIG. 10). More specifically, the configuration information includes network identification information such as an IP address or MAC address of the image forming apparatus, product information, a serial number unique to the apparatus, and the like.

For example, the following pieces of information are registered in the management device list 1000 shown in FIG. 10: a device identification number (DeviceId) 1001 used to uniquely specify a device in the device monitoring system, a device serial number (SerialNo) 1002 used to uniquely specify a device for each manufacturer, a MAC address (MACAddress) 1003 of a network board, a host name (HostName) 1004 of a device, an IPv4 address (IPv4Address) 1005, an IPv6 address (IPv6Address) 1006, and a product name (ProductName) 1007. Ether of the IPv4 address 1005 and IPv6 address 1006 need only be registered, and the host name 1004 need not always be registered. When the host name 1004 is designated, a name solution result is stored in the IPv4 address/IPv6 address.

The device information obtainment unit 402 obtains configuration information and operation information of the image forming apparatuses 102 and 103 via the network I/F 208. Note that the operation information includes various kinds of counter information such as the number of printed sheets and part use counts in the image forming apparatus, log information, failure information, current firmware information, information of a hard disk, and the like. Note that when a log write event from a device is received, for example, the device information obtainment unit 402 requests the device to send log information in response to that request, and receives the log information. Alternatively, another component, for example, the control unit 400 may request log information in response to a log write event. The device information management unit 403 stores device information obtained by the device information obtainment unit in a storage device such as the RAM 203 or HD 205 or in the database 106 or the like, and executes management such as obtainment, updating, and deletion of the device information. The information managed by the device information management unit 403 is sent to the central management apparatus.

A log information comparison unit 404 compares log information obtained from a device and that of the device managed by the device information management unit. More specifically, the log information comparison unit 404 determines whether or not the managed log information is included in that obtained from the device. A device matching determination unit 405 executes device matching determination upon reception of the determination result of the log information comparison unit 404.

A configuration information matching determination unit 406 determines whether or not one attribute of configuration information obtained from a device matches that in the corresponding configuration information of the device. More specifically, in this embodiment, configuration information such as a MAC address or serial number is to be determined.

<Example of Log Information Management Table>

An example of a log information management table 500 managed in the image forming apparatus will be described below with reference to FIG. 5. FIG. 5 shows an example of jam log information of a log type "jam". A log number (LogNo) 501 is a value incremented every time a jam occurs in the image forming apparatus, and is a number which uniquely specify a jam log. A occurred date and time (OccurredDateTimes) 502 indicate an occurred date and time of a jam. A revert date and time (RevertDateTimes) 503 indicate a revert date and time of a jam. A code (Code) 504 is a jam code, and indicates a type of a jam. An occurred position (Position) 505 indicates an occurred position of a jam, and is set with a value which defines each of positions of a main body, feeder, finisher, and the like. A total counter (TotalPages) 506 is set with a total number of printed pages at the time of occurrence of a jam. A processing type (Action) 507 represents a type of processing which causes a jam, and is set with a value which defines each of double-sided printing, staple printing, and the like. A media ID (MediaId) 508 is set with a definition value to which a type, color attribute, and size of a medium as a processing target are assigned as bits. A media direction (Orientation) 509 is set with a definition value of a printing direction, that is, a portrait/landscape direction of a medium at the time of occurrence of a jam. A feeder position (FeederPosition) 510 is set with a feeder stage (cassette 1/2/3, manual insertion, paper deck, or the like) of a medium which causes a jam.

In this log information management table 500, a new log number is additionally registered upon detection of occurrence of a jam, and values of the aforementioned items are specified and written in association with that number. When log information is written, and when a corresponding event is registered, for example, when an event which designates a write access of a jam log is registered, the log write event is notified to the monitoring apparatus.

The jam log has the aforementioned items. Likewise, logs of other types have, for each log, the log number 501, date and time data such as the occurred date and time 502 or a log recorded date and time, the code 504 which defines log details, and the like. Other logs include, for example, an error log, environment log, operation log, and the like. A predetermined number or a predetermined period of these logs is held in the device for each log. For this reason, an information obtainment timing from the external apparatus 322 need not be an immediate timing, and no problem is posed even after an elapse of a certain time period. The external apparatus 322 can obtain a log by designating a log number or all logs. The external apparatus 322 obtains various kinds of log information of the device at an arbitrary timing or in response to the aforementioned notification as a trigger.

As the image forming apparatus, this system is applicable to a laser beam printer using the aforementioned electrophotography method, an inkjet printer using an inkjet method, a thermal head printer adopting a thermal transfer method, or a copying machine, needless to say.

<Processing Sequence of Monitoring Apparatus>

Figure 6:
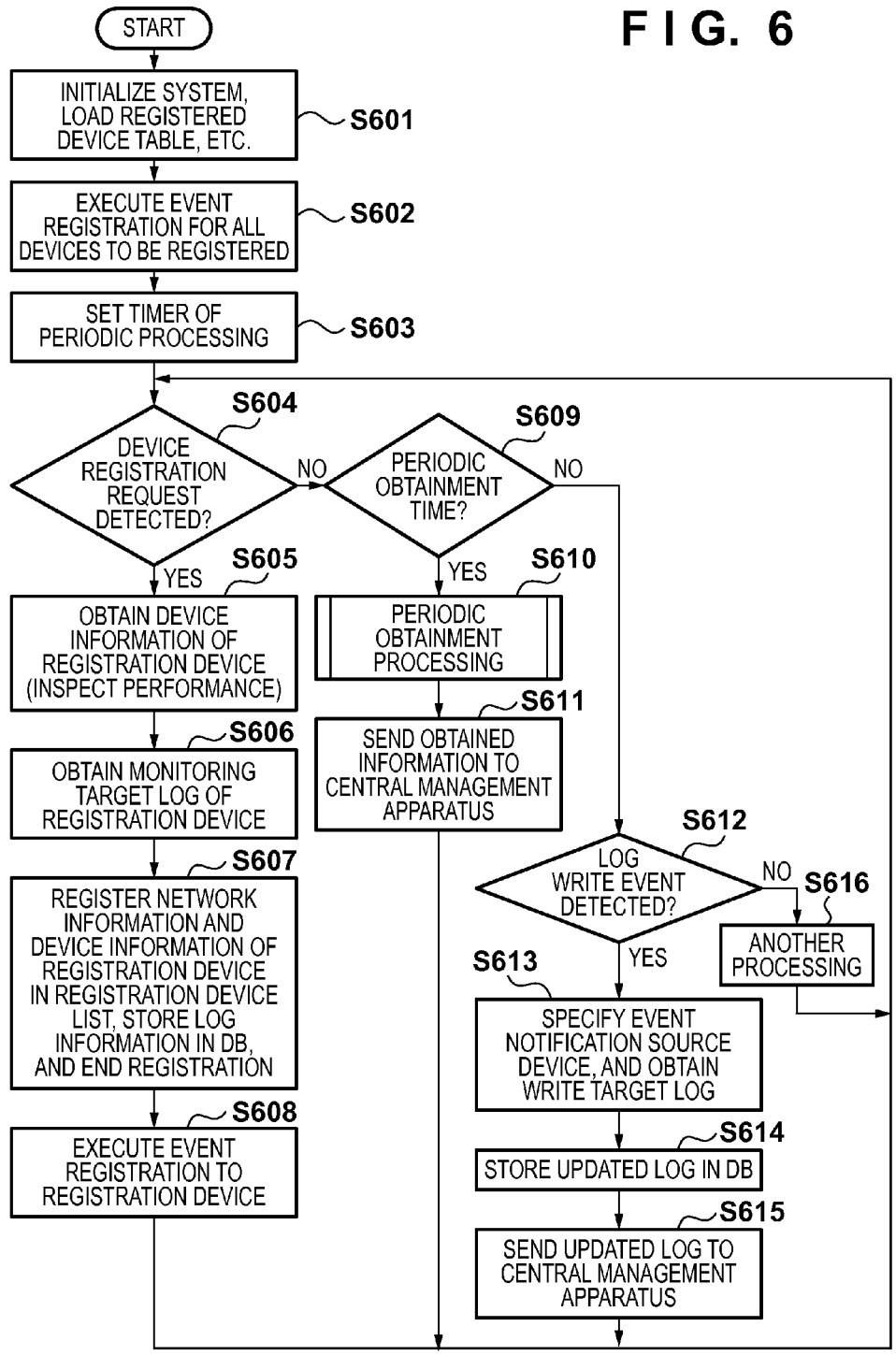
FIG. 6 is a flowchart showing a main operation of the management apparatus 101 according to the embodiment.
Figure 7:
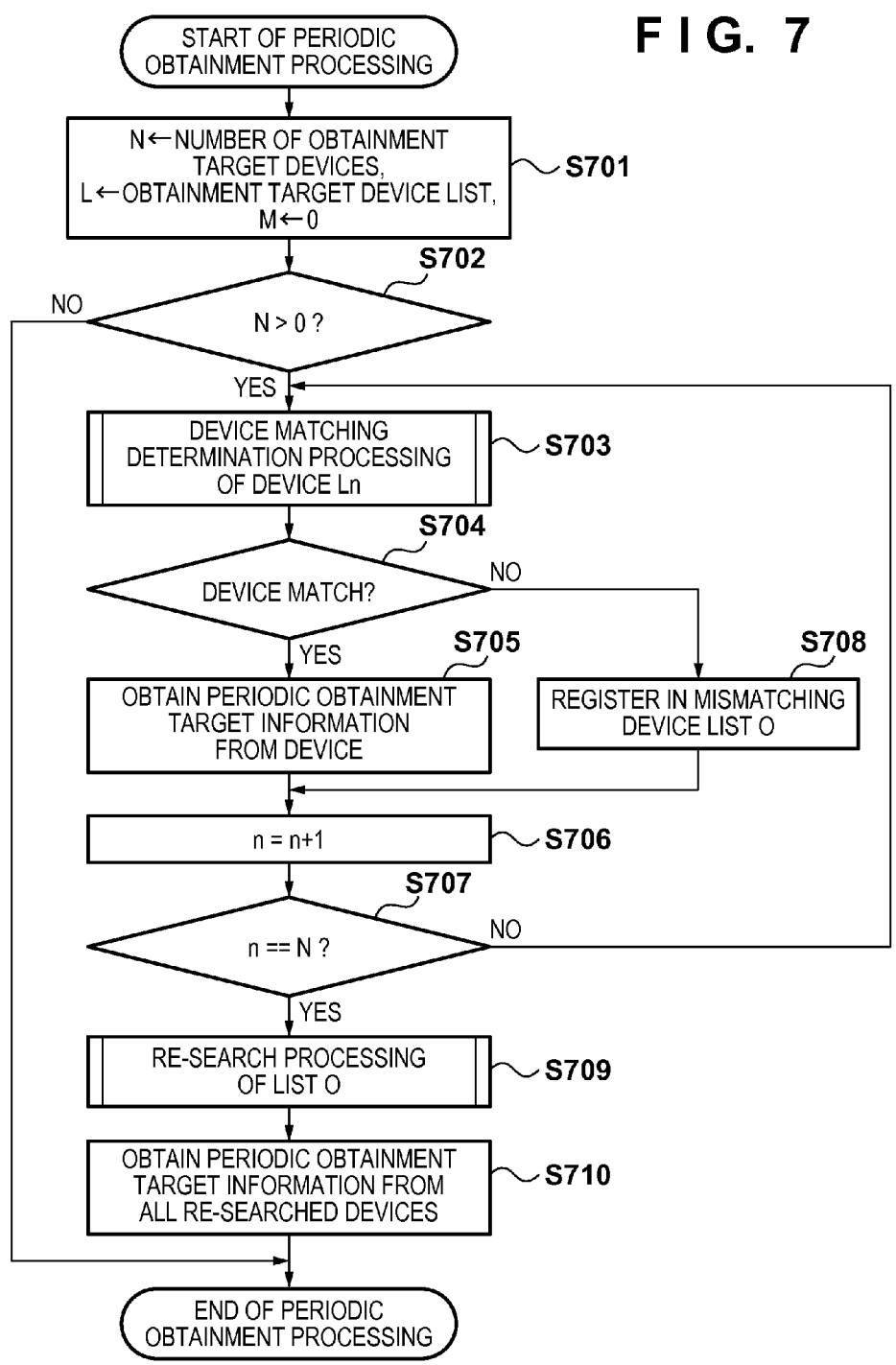
FIG. 7 is a flowchart showing periodic processing of the monitoring apparatus 101 according to the embodiment.
Figure 8:
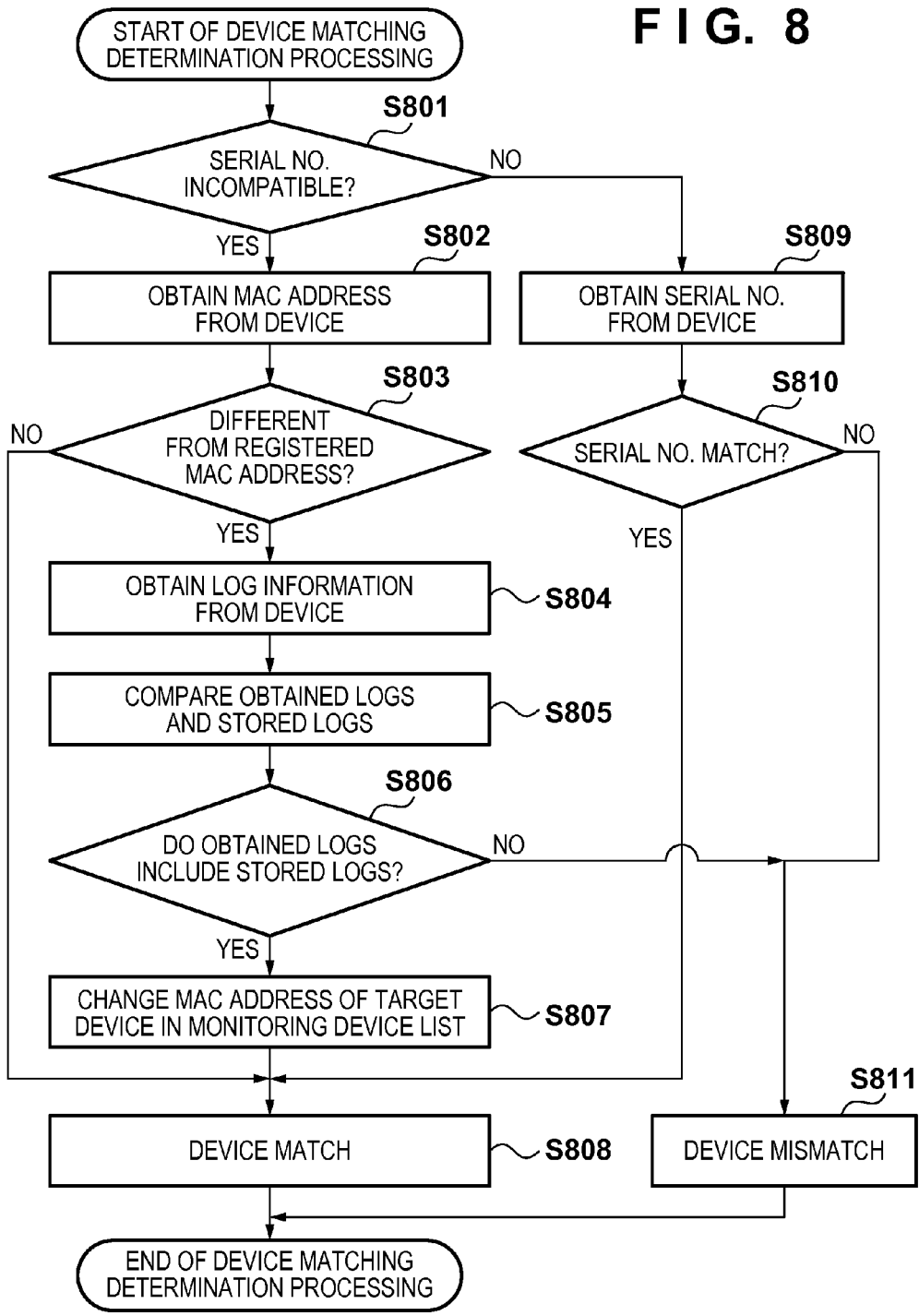
FIG. 8 is a flowchart showing device matching determination processing of the monitoring apparatus 101 according to the embodiment.

Flowcharts shown in FIGS. 6 to 8 are used to explain the processing of the monitoring apparatus 101. Respective steps of the flowcharts are those implemented when the CPU 201 of the monitoring apparatus 101 loads and executes a device monitoring program stored in the ROM or a nonvolatile storage unit such as a hard disk.

FIG. 6 is a main flowchart showing the operation of the monitoring apparatus 101. In the following description, the image forming apparatus will be described as a device to be monitored or simply as a device.

When the power source of the monitoring apparatus 101 is turned on, the processing shown in FIG. 6 is started, and system initialization is executed first upon power-ON (step S601). More specifically, the control unit 400 executes initialization processing of function modules such as the device information management unit 403 and device information obtainment unit. The device information management unit 403 executes processes for loading an information table related to all devices to be monitored, which have already been registered as monitoring targets in the database 106 as a device list, for initializing variables, and so forth. Next, after initialization of communication processing, the device information obtainment unit 402 executes event registration for all devices to be monitored (step S602). In this embodiment, with this event registration, a log write event of a device to be monitored can be detected in step S612, and an update log is obtained in response to detection of a log write event as a trigger. Next, the control unit 400 sets a timer for periodic processing (step S603). In this embodiment, obtainment of operation information such as billing counter obtainment is executed by the periodic processing, and a start timer of this periodic processing is set in step S603, thus driving processing of step S609.

In a main loop of steady processing after the initialization processing, the control unit 400 determines whether or not a device registration request is detected (step S604). The device registration request is issued by, for example, a device registration instruction from the central management apparatus (not shown) or an instruction from a UI unit (not shown). The registration request is appended with designation of network information such as an IP address and host name, which are used to specify a device to be registered. If YES in step S604, the control unit 400 calls the device registration unit 401 so as to execute device registration processing. Using the device information obtainment unit 402, the device registration unit 401 requests an address, for example, an IP address included in the network information appended to the device registration request to send device configuration information and the like, and obtains that information (step S605). Note that since kinds of device configuration information that can be obtained are different for respective products, device performance inspection which specifies information that can be obtained may be executed in this case. More specifically, information indicating device configuration information that can be obtained (for example, whether or not a serial number can be obtained), a communication performance (protocols to be supported), and the like are inspected. In this embodiment, since processing depends on whether or not a serial number can be obtained, whether or not a serial number can be obtained is inspected. This device performance inspection is executed prior to, for example, a device configuration information request. As a result of the device performance inspection, if a serial number can be obtained, a serial number included in the device configuration information is obtained, and the obtained value is stored in the serial number 1002 of the management device list 1000 shown in FIG. 10; otherwise, 0 is stored. In the example shown in FIG. 10, since a serial number of device of DeviceId: ABC011230001 is 0, no serial number can be obtained from the device.

After step S605, the device registration unit 401 obtains log information to be monitored of the device to be registered using the device information obtainment unit 402 (step S606). The obtained log information is used not only in device matching determination, but also whether or not the obtained log information is to be sent as information to be monitored is evaluated. Then, processing for sending information to be sent to the central management apparatus or the like is executed. A description of use applications other than device matching determination will not be given. Next, the registration processing in the management device list 1000, a device log list 1100 (FIG. 11), and a device log details list 1200 (FIG. 12) is executed (step S607). Information to be registered in the management device list 1000 includes the network information and the device configuration information obtained in step S605.

The log information obtained in step S606 is registered in the device log list 1100 exemplified in FIG. 11 and the device log details list 1200 exemplified in FIG. 12. The device log list 1100 is a list which records, for respective logs, processing states related to various logs for respective devices, and includes, for example, the following pieces of information shown in FIG. 11.

A device identification number (DeviceId) 1101 is the same as the device identification number 1001, and uniquely specifies a device in the system. FIG. 11 shows an extract of the device log list of DeviceId: ABC011230001. A log type (LogType) 1102 specifies a type of log such as a service call, alarm, environment, and user operation. An obtained log number (ObtainedLogNo) 1103 stores a log number (the log number 501 in FIG. 5) obtained from a device, and used to specify a log number upon loading a log information management table of a device. A sent log number (SentLogNo) 1104 stores a log number already sent to the central management apparatus. In log information sending processing to the central management apparatus, since data which is already obtained but is not sent is to be sent, the obtained log number 1103 and sent log number 1104 are used. As for log details, the device log details list is referred to.

FIG. 12 exemplifies the device log details list 1200. The device log details list 1200 is a list of log details for each device (DeviceId) and for each log type 1102. Log information sent to the central management apparatus is deleted while leaving a predetermined number of pieces of information. A device identification number (DeviceId) 1201 is the same as the device identification numbers 1001 and 1101. A log type (LogType) 1202 is the same as the log type 1102, and FIG. 12 shows an example of a jam log of DeviceId: ABC011230001. Items 1203 to 1209 are the same as those having the same names in FIG. 5, and stores values that can be obtained from the device.

The log information management table 500 in FIG. 5 and the device log details list 1200 in FIG. 12 correspond to each other like the log number (LogNo) 1203=log number 501, occurred date and time (OccurredDateTimes) 1204=occurred date and time 502, revert date and time (RevertDateTimes) 1205=revert date and time 503, code (Code) 1206=code 504, . . . . Items having the same titles basically correspond to each other. In comparison processing of an obtained log from a device and a stored log of a device to be monitored, as will be described later (steps S805 and S916), these logs are compared for respective corresponding logs. FIG. 12 does not show the media ID (MediaId) 508, media direction (Orientation) 509, and feeder position (FeederPosition) 510 of the log information management table 500, but information obtained from a device is similarly stored.

After step S607, the device registration unit 401 requests the device information obtainment unit 402 to start monitoring by executing event registration for the newly registered device (step S608). After step S608, the process returns to step S604. The event registration can designate and register, for example, a target log type of a log write event. An event handle obtained by the event registration is stored in association with the corresponding device identifier and log type.

If NO in step S604, that is, if a device registration request is not detected, the control unit 400 determines whether or not a periodic obtainment time is reached (step S609). If YES in step S609, the control unit 400 calls periodic obtainment processing (step S610). The periodic obtainment processing will be described later using the flowchart shown in FIG. 7. Upon completion of the periodic obtainment processing in step S610, device information obtained by the periodic obtainment is sent to the central management apparatus (step S611). After step S611, the process returns to step S604.

If NO in step S609, the control unit 400 determines whether or not a log write event is detected (step S612). If YES in step S612, a device of an event notification source is specified from an event handle included in the event, and obtains a log to be written using the device information obtainment unit 402 (step S613). More specifically, when it is specified that a jam log event of the device identification number ABC011230001 is notified, a device log list of the device identification number ABC011230001 is referred to so as to obtain the obtained log number 1103, and that obtained log number is sent to the device, thus requesting the device to obtain log information after the obtained log number. For example, when the obtained log number is 0x000123456 and the latest log number of the device is 0x000123459, the device sends logs from 0x000123457 to 0x000123459 to the monitoring apparatus 101. The control unit 400 calls the device information management unit 403, which stores update logs in the database (step S614). More specifically, update logs sent from the device are registered in the device log details list 1200, and the obtained log number 1103 of the device log list 1100 is updated. After completion of the processing of step S614, the update logs are sent to the central management apparatus (step S615). More specifically, logs which have already been obtained but are not sent are sent with reference to the sent log number 1104 and obtained log number 1103 of the device log list 1100. After step S615, the process returns to step S604. If NO in step S612, another appropriate processing is executed (step S616), and the process returns to step S604. A detailed description of step S616 will not be given. Note that steps S604, S609, and S612 in FIG. 6 are sequentially executed to make determinations. However, after step S603, the processing of FIG. 6 may be temporarily stopped, and may wait for a processing restart trigger such as an interruption. In this case, arrival of a device registration request or periodic obtainment time, detection of a log write event, or the like is used as a trigger, and processing at the time of generation of each trigger is started in response to that trigger.

<Periodic Obtainment Processing>

Figure 9:
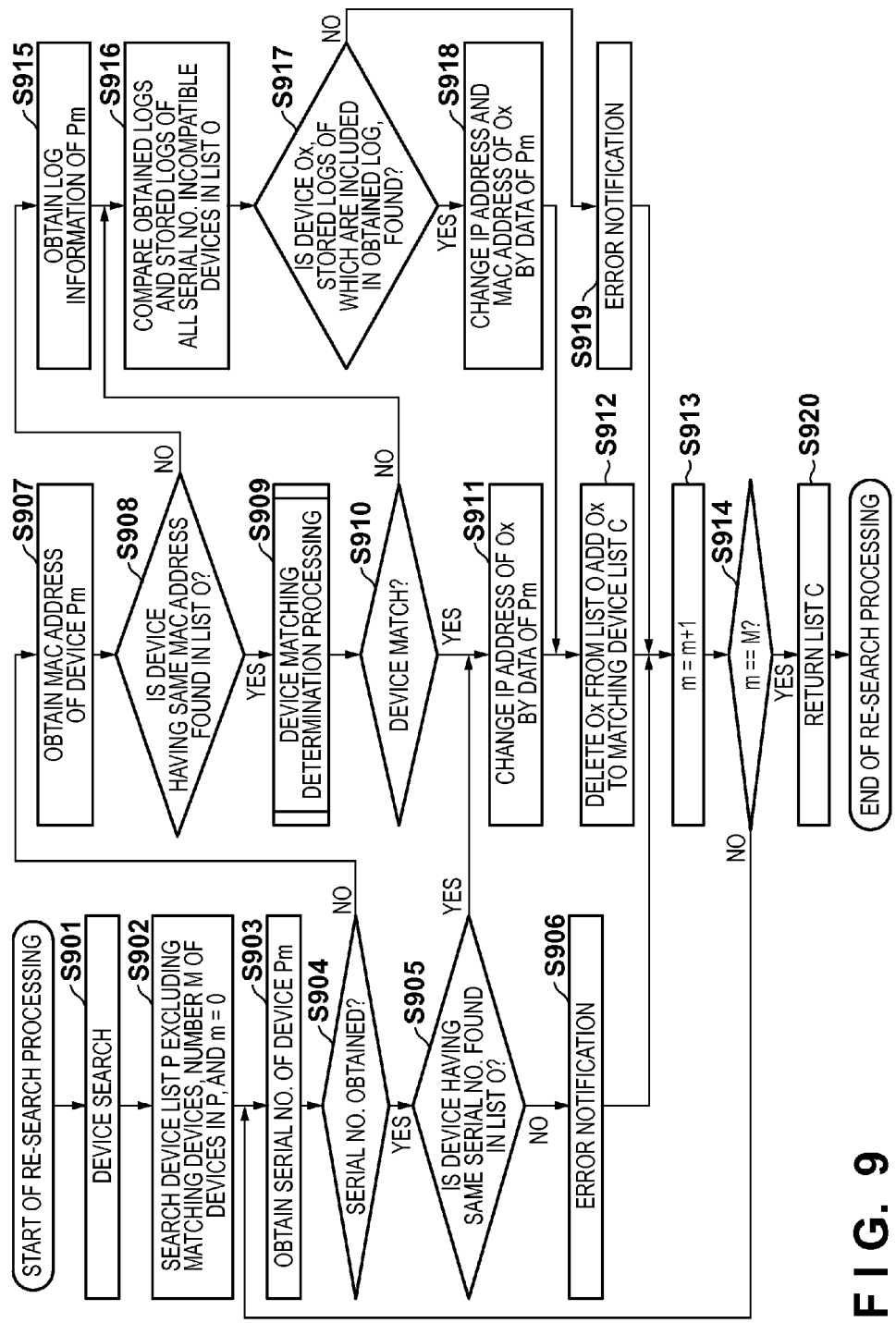
FIG. 9 is a flowchart showing re-search processing of the monitoring apparatus 101 according to the embodiment.

The flowchart of the periodic processing in step S610 will be described below with reference to FIG. 7. Initially, letting N be the number of periodic obtainment target devices, and L be an obtainment target device list, the control unit 400 initializes a variable n by zero (step S701). Note that the obtainment target device list L is a list including at least a device identification number (DeviceId), and a communication address such as an IP address is obtained with reference to the management device list 1000 at the time of communications. The control unit 400 determines whether or not the number N of obtainment target devices is larger than N (step S702). If YES in step S702, the control unit 400 executes device matching determination processing for an n-th device Ln of the obtainment target device list (step S703). If NO in step S702, since there is no processing target device, the periodic obtainment processing ends. The device matching determination processing in step S703 is processing for determining identity of a device, and details of this processing will be described later with reference to the flowchart shown in FIG. 8. The control unit 400 determines whether or not devices match as a result of step S703 (step S704). If YES in step S703, since the control unit 400 can confirm the target device, it continues the obtainment processing, that is, it obtained periodic obtainment target information from the device (step S705). The periodic obtainment target information includes, for example, operation information indicating an operation state of the device. If NO in step S704, the control unit 400 registers that device in a mismatching device list O (step S708). A device registered in the mismatching device list undergoes reprocessing in re-search processing (to be described later (step S709; FIG. 9). After step S705 or S708, the control unit 400 increments n (step S706), and determines whether or not n is equal to N, that is whether or not processing of all obtainment target devices is complete (step S707). If YES in step S707, the control unit 400 executes re-search processing for all devices registered in the mismatching device list O (step S709). The re-search processing will be described later with reference to the flowchart shown in FIG. 9. If NO in step S707, the process returns to step S703. With the re-search processing in step S709, the control unit 400 obtains a matching device list, and obtains periodic obtainment target information from all devices in the obtained list (step S710). After completion of step S710, the periodic obtainment processing ends. Pieces of information obtained in steps S705 and S710 are stored in the monitoring apparatus as those related to the corresponding devices. Therefore, as for a device which is judged to be the same as that which has already managed by the monitoring apparatus, the obtained information is stored in association with that device. Also, as for a device which is judged not to be the same as any of those which have already been managed by the monitoring apparatus, that device is added to the management device list 1000, the obtained log information is stored in the log information management table 1100, and a new table for that device is assured for the jam log management table 1200 if an event is detected.

The device matching determination processing in step S703 will be described below with reference to the flowchart shown in FIG. 8. Initially, the control unit 400 determines whether or not the processing target device is a serial No. incompatible device, that is, whether or not a serial number can be used for matching determination (step S801). In this step, the control unit 400 refers to the registration contents of the management device list 1000, and when the serial number 1002 of that device stores "0", it can determine that the target device is an incompatible device. If YES in step S801, that is, if the target device is an incompatible device, the control unit 400 obtains a MAC address from the device using the device information obtainment unit 402 (step S802). The control unit 400 determines whether or not the obtained MAC address is different from a registered MAC address (step S803). If the MAC addresses match, that is, if NO in step S803, the control unit 400 determines that the target device matches the registered device (step S808). This is processing for speeding up the device matching processing. Strictly speaking, even when both of the IP address and MAC address match, a device is likely to be changed. Since obtainment of log information of a device and comparison processing require a longer time than a MAC address obtainment time, this step is executed under the assumption that the IP address and MAC address are never changed at the same time on the management level. Thus, if the MAC addresses match, the control unit 400 determines that the target device is the registered device (NO in step S803). If the device matching determination processing is to be strictly executed, steps S802 and S803 are omitted, and step S804 is executed after step S801. If YES in step S803, the control unit 400 obtains log information from the device (step S804). Upon this obtainment, the control unit 400 designates log numbers held in the device log details list 1200 to obtain log information. For example, in the example of FIG. 12, since log numbers 0x000123457 to 0x000123459 are held, the control unit 400 obtains those logs from the device. When held log numbers are cleared on the device side, that is, when a log number cannot be specified, all logs of a log type to be compared, which are held by the device can be obtained. The obtained logs are compared with the device log details list 1200 on item levels (step S805). In this case, all items or some extracted items may be compared. With this comparison processing, the control unit 400 determines whether or not the obtained logs include already stored logs (step S806). If YES in step S806, the control unit 400 changes the MAC address of the target device in the monitoring device list by that obtained in step S802 (step S807). Thus, since NO is determined in step S803 in the next determination processing, device identity determination can be speeded up. After step S807, the control unit 400 outputs a determination result "devices match" (step S808), thus ending the device matching determination processing. On the other hand, if NO in step S806, the control unit 400 outputs a determination result "devices do not match" (step S811), thus ending the device matching processing. On the other hand, if NO in step S801, since the device matching determination can be executed using a serial number, the control unit 400 obtains a serial number from the device using the device information obtainment unit 402 (step S809). The control unit 400 determines whether or not the obtained serial number matches the registered serial number of the determination target device (step S810). If the serial numbers match, that is, if YES in step S810, the process jumps to step S808. If the serial numbers do not match, that is, if NO in step S810, the process advances to step S811. After step S808 or S811, the device matching determination processing ends.

Note that a coincidental match is still possible even in step S805, but the probability of matching is as low as no problem is posed in practice.

The re-search processing in step S709 will be described below with reference to the flowchart shown in FIG. 9. A target device of this re-search processing is a registered device corresponding to a mismatching device (it is judged that devices do not match) in the periodic processing in FIG. 7. A re-search is conducted, and a list of devices which can be specified as registered devices is returned.

Initially, the control unit 400 conducts a broadcast search or multicast search of devices on the LAN 104 (step S901). The control unit 400 registers devices excluding those, which are determined to match the registered devices in step S703, from all devices found in step S901 in a search device list P, and initializes a variable m for processing to zero. Let M be the number of devices registered in the search device list P (step S902). The device information obtainment unit 402 obtains a serial number from an actual device Pm as an m-th element of the search device list P (step S903). The control unit 400 determines whether or not the serial number can be obtained in step S903 (step S904). If YES in step S904, that is, if the serial number can be obtained, the control unit 400 determines whether or not a device having the same serial number as the obtained serial number is included in the mismatching device list O (step S905). If YES in step S905, the device information management unit 403 rewrites IP address information of an element Ox of the list O found in step S905 by an IP address of the actual device Pm (step S911). This IP address can be obtained in step S903. If NO in step S905, the control unit 400 outputs an error notification indicating that device monitoring of that device cannot be continued (step S906), and the process advances to step S913.

If NO in step S904, the device information obtainment unit 402 obtains a MAC address of the actual device Pm (step S907), and the control unit 400 determines whether or not a device having the same MAC address as the obtained MAC address is included in the mismatching device list O (step S908). If YES in step S908, the control unit 400 executes the device matching determination processing shown in FIG. 8 as to whether or not an element Ox of the list O found in step S908 matches the actual device Pm (step S909). The control unit 400 determines whether or not devices match in step S909 (step S910). If YES in step S910, the control unit 400 rewrites IP address data of the registered device Ox by that of the actual device Pm (step S911). Next, the control unit 400 deletes the element Ox from the mismatching device list O, and adds the element Ox to a matching device list C (step S912). Then, the control unit 400 increments m (step S913).

If NO in step S908, the device information obtainment unit 402 obtains log information from the actual device Pm (step S915). The control unit 400 compares the log information obtained in step S915 with stored log information of all serial No. incompatible devices (those from which a serial number cannot be obtained) (step S916). The control unit 400 determines whether or not an element Ox corresponding to the saved log information of itself included in the obtained logs from the actual device Pm in step S916 is found (step S917). If YES in step S917, the control unit 400 rewrites IP address data and MAC address data of the registered device Ox by those of the actual device Pm (step S918). If NO in step S917, the control unit 400 outputs an error notification indicating that device monitoring of that device cannot be continued (step S919), and the process advances to step S913. After step S913, the control unit 400 determines whether or not m is equal to M, that is, if processing is complete for all devices in the search device list (step S914). If YES in step S914, the control unit 400 returns the matching list C as the result of this processing (step S920), thus ending the re-search processing. If NO in step S914, the process returns to step S903.

With the aforementioned arrangements and sequences, log information related to, for example, an event such as a failure which has occurred in a network device to be managed is also held in the management apparatus, and is collated with that obtained from the network device, thus determining the identity. For this reason, even when the device to be managed cannot provide identification information unique to the device such as a serial number, that log information is handled as a criterion for judgment as if it were identification information, thus judging the identity of the device with high precision. Since the identity can be determined without having to rely on only identification information depending on a component of the network device, even when that component is exchanged, the identity of the device main body can be judged.

Second Embodiment

The first embodiment has explained the case in which a plurality of logs are compared for one log type (jam log). As for logs to be compared, one information may or may not specify a device depending on properties of logs. For example, a user operation log is one information which can specify a device since one user cannot operate another device at the same time. The same applies to a device environment log. That is, as the environment log, since temperature and humidity values of respective parts of a device are recorded under a specific condition (for example, an error occurrence timing), a possibility of generation of a log having the same contents by another apparatus at the same time is very low. For this reason, the device has a high specificity. As for a jam log, error log, and the like, although errors having the same contents are unlikely to occur at the same tie, to have the same log number, a possibility of such errors is undeniable, and a device specifying degree is low. The number of logs to be compared is changed depending on properties of those logs to be compared, and different device specifying degrees. In case of logs having low device specifying degrees, a plurality of log types may be obtained and compared. For a device from which a log having a high specifying degree can be obtained, one or a few logs having a high specifying degree are compared. For a device from which a log having a high specifying degree cannot be obtained, a plurality of logs having a low specifying degree, or one or a few combinations of a plurality of types of logs may be compared. Thus, log comparison processing can be flexibly executed at high precision, thus allowing efficient automatic monitoring.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261632, filed Nov. 29, 2012, which is hereby incorporated by reference herein in its entirety.

What is claimed is:

1. A management apparatus for managing a device connected to a network, comprising:
a first management unit configured to manage first identification information of a device to be managed;
a first storage unit configured to store log information obtained from the device to be managed;
a first determination unit configured to determine whether or not first identification information which is obtained from a device from which first information is allowed to be obtained via the network matches the first identification information managed by said first management unit;
a second storage unit configured to store operation information obtained from a device in association with the device from which the first identification information which is determined by said first determination unit to match the managed first identification information is obtained; and
a second determination unit configured to determine whether or not log information obtained from a device from which first identification information is not allowed to be obtained via the network matches the log information stored in said first storage unit,
wherein said second storage unit stores operation information obtained from a device in association with the device from which the log information which is determined by said second determination unit to match the stored log information is obtained.

2. The apparatus according to claim 1, further comprising a second management unit configured to manage second identification information including network identification information of a device to be managed,
wherein when second identification information obtained from a device from which first identification information is not allowed to be obtained via the network is not managed by said second management unit, said second determination unit determines whether or not log information obtained from the device matches log information stored in said first storage unit.

3. The apparatus according to claim 2, further comprising an update unit configured to update, when second identification information obtained from a device from which first identification information is not allowed to be obtained via the network is not managed by said second management unit, and when said second determination unit determines that two pieces of log information match, the second identification information managed by said second management unit by the second identification information obtained from the device from which the log information is obtained.

4. The apparatus according to claim 2, further comprising an output unit configured to output an error notification indicating that management is not allowed to be continued for the device to be managed when said second determination unit determines that two pieces of log information do not match.

5. The apparatus according to claim 1, wherein said first storage unit obtains log information from the device to be managed in response to reception of a write event notification of log information from the device to be managed, and stores the obtained log information.

6. The apparatus according to claim 1, wherein the log information includes at least one of a jam log, a user operation log, and a device environment log.

7. The apparatus according to claim 1, wherein the first identification information is a serial number different from network identification information of a device.

8. A management method executed by a management apparatus for managing a device connected to a network, comprising:
  managing first identification information of a device to be managed;
  storing log information obtained from the device to be managed;
  determining whether or not first identification information which is obtained from a device from which first identification information is allowed to be obtained via the network matches the first identification information managed in the managing;
  storing operation information obtained from a device in association with the device from which the first identification information which is determined in the first determining to match the managed first identification information is obtained; and
  determining whether or not log information obtained from a device from which first identification information is not allowed to be obtained via the network matches the log information stored in the first storing,
  wherein in the second storing, operation information obtained from a device is stored in association with the device from which the log information which is determined in the second determining to match the stored log information is obtained.

9. The method according to claim 8, further comprising managing second identification information including network identification information of a device to be managed,
  wherein in the second determining, when second identification information obtained from a device from which first identification information is not allowed to be obtained via the network is not managed in the second managing, it is determined whether or not log information obtained from the device matches log information stored in the first storing.

10. The method according to claim 9, further comprising updating, when second identification information obtained from a device from which first identification information is not allowed to be obtained via the network is not managed in the second managing, and when it is determined in the second determining that two pieces of log information match, the second identification information managed in the second managing by the second identification information obtained from the device from which the log information is obtained.

11. The method according to claim 9, further comprising outputting an error notification indicating that management is not allowed to be continued for the device to be managed when it is determined in the second determining that two pieces of log information do not match.

12. The method according to claim 8, wherein in the first storing, log information is obtained from the device to be managed in response to reception of a write event notification of log information from the device to be managed, and the obtained log information is stored.

13. The method according to claim 8, wherein the log information includes at least one of a jam log, a user operation log, and a device environment log.

14. The method according to claim 8, wherein the first identification information is a serial number different from network identification information of a device.

15. A non-transitory computer-readable medium recording a program for causing a computer to execute a management method according to claim 8.

* * * * *